United States Patent [19]

Kawamoto

[11] Patent Number: 6,080,222
[45] Date of Patent: Jun. 27, 2000

[54] ORGANIC LIQUID NUTRITION SOURCE FOR PLANTS AND MANUFACTURING METHOD FOR SAME

[76] Inventor: Hidekatsu Kawamoto, 370-2 Toya, Numazu-shi, Shizuoka-ken, Japan

[21] Appl. No.: 09/259,318

[22] Filed: Mar. 1, 1999

[30] Foreign Application Priority Data

Mar. 2, 1998 [JP] Japan ................................ 10-49221

[51] Int. Cl.[7] ............................... C05F 1/00; C11B 13/00
[52] U.S. Cl. ................... 71/15; 71/16; 71/17; 71/64.1; 554/8; 562/516
[58] Field of Search ................................ 71/15, 16, 17, 71/11, 64.1; 562/516; 554/8, 21

[56] References Cited

U.S. PATENT DOCUMENTS

| | | | |
|---|---|---|---|
| 4,078,094 | 3/1978 | Katzen | 426/641 |
| 4,126,439 | 11/1978 | Stekoll . | |
| 4,615,839 | 10/1986 | Seto et al. | 260/412 |
| 4,961,936 | 10/1990 | Rubin | 426/7 |
| 5,158,595 | 10/1992 | Stillman | 71/64 |

FOREIGN PATENT DOCUMENTS

| | | |
|---|---|---|
| 62-084007 | 4/1987 | Japan . |
| WO 97/24933 | 7/1997 | WIPO . |

OTHER PUBLICATIONS

Derwent Abstract, AN 97–503814/97, CN 1123266, May 29, 1996.

*Primary Examiner*—Steven P. Griffin
*Assistant Examiner*—Elin Warn
*Attorney, Agent, or Firm*—Oblon, Spivak, McClelland, Maier & Neustadt, P.C.

[57] ABSTRACT

An organic liquid source of nutrition for plants includes a liquid mixture made from animal-derived raw materials decomposed naturally through the autolysis of cells, separated by addition of hydrochloric acid into a first liquid consisting primarily of fatty acids to which alcohol is added, and a second liquid consisting primarily of soluble protein to which surfactant is added, and a sugar-containing liquid mixed and agitated with these liquids.

12 Claims, No Drawings

ORGANIC LIQUID NUTRITION SOURCE FOR PLANTS AND MANUFACTURING METHOD FOR SAME

BACKGROUND OF THE INVENTION

1. Field of the Invention

The present invention relates to an organic liquid source of nutrition (fertilizer) for plants that is made from the entrails, skin and heads of fish, or the entrails or blood of other animals or the like as the raw materials, exhibits stable quality and a long shelf life, and is also easy to use and can be absorbed directly by the roots and root hairs of plants, and also to the manufacturing method for same.

2. Description of the Prior Art

As is generally known, fertilizer is typically applied as a source of nutrition for plants in general agriculture and horticulture, but most of the fertilizer used up until now has been inorganic in nature. In addition, while liquid fertilizer is widely used, nearly all of this liquid fertilizer is inorganic, as virtually no liquid organic fertilizer is available.

However, since the tissues of plants are organic in nature, consisting of glucose, proteins (amino acids) and fatty acids, inorganic fertilizer applied to plants cannot be incorporated directly as tissue. So typically, when inorganic fertilizer is applied to plants, only the glucose formed by photosynthesis has the ability to enlarge the plant tissues, so the fertilizer itself cannot effectively form the tissues of plants. Moreover, conventional inorganic fertilizer is low in concentration and has poor shelf life, and also does not supply nutrients in a balance that is good for the soil microbes that contribute to plant growth. It is also expensive and impractical.

Nevertheless, if the glucose, proteins and fatty acids that comprise the tissues of plants can be absorbed directly by the roots and root hairs of plants by utilizing soil microbes, then, in contrast to the case of inorganic fertilizer, not only is plant growth excellent but the quality of the leaves and fruit is also excellent.

To this end, the object of the present invention is to provide an organic liquid source of nutrition (fertilizer) for plants that not only contains large amounts of glucose, proteins and fatty acids and has an excellent shelf life but also exhibits stable quality, and when sprayed during the cultivation of crops in the field or during the cultivation of plants in horticulture, or when used in hydroponics or the like, it can be absorbed directly by the roots or root hairs of plants, and moreover it can activate the symbiotic microbes present in soil to promote absorption by roots and root hairs.

In addition, since the liquid nutrition source according to the present invention is an extremely concentrated liquid, the present invention includes the case in which the liquid is used when adequately diluted and sprayed directly on the soil in fields or sprayed on the leaves or stalks or other parts of plants, and the case in which the liquid is used in nutrient liquids or culture liquids in hydroponics and aeroponics.

SUMMARY OF THE INVENTION

In order to achieve the aforementioned object, the organic liquid source of nutrition (fertilizer) for plants according to the present invention comprises a liquid mixture made from animal-derived raw materials decomposed naturally through the autolysis of cells, separated by the addition of hydrochloric acid into a first liquid consisting primarily of fatty acids to which alcohol is added, and a second liquid consisting primarily of soluble protein to which surfactant is added, and a sugar-containing liquid, such as a glucose-containing liquid etc., mixed and agitated with these liquids.

In addition, the manufacturing method for the organic liquid source of nutrition (fertilizer) for plants according to the present invention comprises the steps of: allowing animal raw materials to decompose-naturally through the autolysis of cells after the passage of a fixed period of time under constant temperature conditions; adding hydrochloric acid to the decomposed material thus obtained and allowing it to settle for a fixed period of time so that it separates into a first liquid consisting primarily of fatty acids and a second liquid consisting primarily of soluble protein; adding alcohol to the separated first liquid to adjust its viscosity and also obtain a hydrophilic liquid; adding water and surfactant to the aforementioned second liquid to obtain an aqueous solution; agitating the second liquid while adding the first liquid and mixing; and agitating and mixing a sugar-containing liquid such as a glucose-containing liquid etc., into the liquid mixture thus obtained.

The organic liquid source of nutrition (fertilizer) for plants according to the present invention has a good balance in its glucose, fatty acid and protein content, so by spraying it on the soil, it is directly absorbed by the roots of plants and activates the symbiotic microbes that coexist in soil.

This activation enables the source to be indirectly absorbed so growth of plant is effective and at the same time enables the artificially added polluting substances to be decomposed so a return to the naturally balanced state is attained and thus crops with high product value can be grown.

In addition, even though it is organic in nature, this liquid nutrition source is concentrated, so it has an excellent shelf life.

DESCRIPTION OF THE PREFERRED EMBODIMENT

The organic liquid source of nutrition (fertilizer) for plants according to the present invention is made from animal-derived raw materials, so as the raw materials it is possible to use not only fish, but various types of animal waste products such as the intestines, entrails, blood, skin or heads of cows, pigs or other domestic animals or small animals.

The organic liquid source of nutrition (fertilizer) for plants according to the present invention is manufactured as follows. The aforementioned animal-derived raw materials are supplied to a sealed tank and allowed to sit undisturbed for a fixed length of time under constant temperature conditions to activate the decomposition enzymes present in the cells of the animal bodies and induce natural decomposition through autolysis. Hydrochloric acid is added to the naturally decomposed material and allowed to settle so that the aforementioned material is chemically separated. Solids are removed and the chemically separated material is kept for a fixed length of time at room temperature so that it separates into a first liquid consisting primarily of fatty acids containing gelatinous proteins and a second liquid consisting primarily of free soluble proteins (amino acids).

Then, to the first liquid are added one or more of methyl alcohol and other alcohols, aqueous acetic acid or urea if necessary and the mixture is mixed and agitated well to adjust its viscosity and obtain a hydrophilic liquid.

In addition, to the second liquid are added water and surfactant and other liquids and the mixture is mixed and agitated well to obtain a lipophilic liquid.

While agitating the second liquid thus produced, the first liquid is added gradually until roughly the same amount of the first liquid is added to the second liquid, at which point glucose or a glucose-containing liquid is mixed and agitated into the liquid to obtain a concentrated organic liquid source of nutrition (fertilizer) for plants.

Here follows a more detailed description of the method of manufacturing the organic liquid source of nutrition (fertilizer) for plants according to the present invention. The aforementioned animal-derived raw materials are placed in a sealed tank kept in the temperature range of 40–70° C. and allowed to sit undisturbed for 5–10 days to activate the decomposition enzymes present in the cells of the animal bodies and induce natural decomposition through autolysis as the primary decomposition. The product thus obtained is a highly viscous material consisting of liquids in the amount of roughly 50% by weight, solids in the amount of roughly 15% by weight and the remainder a butter-like semisolid material.

Hydrochloric acid with a hydrochloric acid concentration of roughly 35% is added to this highly viscous material and it is allowed to settle for 2–5 days so that the chemical action of the hydrochloric acid induces secondary decomposition. Some of the aforementioned solid material and semisolid material is dissolved to obtain a highly viscous liquid containing solids (animal bones and tendons) in the amount of roughly 15% by weight.

In this case, the amount of hydrochloric acid added is set so that the pH of the solution does not drop below 6.8, so the addition of hydrochloric acid is halted when the pH goes below 6.8. This is because the decomposing action of the liquid is suppressed if the liquid becomes strongly acidic.

In addition, for the present invention, basically as long as the aforementioned primary decomposition and secondary decomposition occur, this is sufficient as the decomposition actions. However, depending on the type of raw material, if undecomposed proteins are still present in the tank, it is possible to add endopeptidase to perform a final decomposition to amino acid. The amount of endopeptidase added in the final decomposition should be roughly 3–5% by weight and the final decomposition time should be roughly 5–30 hours.

The aforementioned highly viscous liquid is filtered to remove solids and the filtrate is left undisturbed for roughly 10–30 hours at room temperature so that it separates into an upper layer of a first liquid consisting primarily of fatty acids containing gelatinous proteins and lower layer of a second liquid consisting primarily of free soluble proteins containing amino acids.

Once the liquid separates into the aforementioned first liquid and second liquid in upper and lower layers, each liquid is filtered separately to remove solids. Then, to the first liquid are added methyl alcohol and other alcohols in the amount of no more than 20% by weight, aqueous acetic acid in the amount of no more than 10% by weight and the mixture is mixed and agitated well to adjust its viscosity and obtain a hydrophilic liquid. In this case, to the first liquid may also be added isopropyl alcohol, urea solution, lactic acid solution or the like to adjust the viscosity and increase its hydrophilic character.

In addition, to the second liquid are added water in the amount of no more than 25% by weight and surfactant in the amount of 1–10% by weight and the mixture is mixed and agitated well. Examples of surfactants that can be used include castor oil-based surfactants, triethanol-based surfactants and monoethanol-based surfactants. By adding the water and surfactant, the second liquid can be made into an emulsified liquid and made lipophilic.

Next, while mixing and agitating said lipophilic second liquid well, the first liquid is added gradually until roughly the same amount of the first liquid is added to the second liquid, at which point the mixing and agitation is halted to obtain a liquid mixture. Next, into this liquid mixture is mixed 40–120% by weight of an aqueous solution of sugar such as glucose, blackstrap molasses, etc. and the mixture is agitated well to produce a very concentrated liquid source of nutrition (fertilizer) for plants with a good balance of nutrients. Depending on the reaction circumstances, it is possible to use a paper sludge liquid or coffee residue liquid as part of the aqueous sugar solution.

Moreover, at the time of the mixing and agitation of the first liquid and second liquid and at the time of the mixing and agitation of the first liquid, second liquid and the aqueous solution of glucose or blackstrap molasses, by using a high-speed mixer such as a colloid mixer or homogenizer, the various liquid components can be divided into fine globules so that the oil-based and water-based components exist in the emulsion state. Thus, the various components of the liquid source of nutrition (fertilizer) for plants are mixed well and not only can the amount of surfactant added be reduced but also the quality can be improved.

Here follows an explanation of one preferred embodiment of the present invention.

As the raw material, 600 kilograms of horse mackerel is placed in a tank and sealed. The tank is subjected to temperature control in the range of 40–65° C. and allowed to sit undisturbed for 7 days. The product thus obtained is a highly viscous material consisting of liquids in the amount of approximately 53% by weight, solids in the amount of approximately 16% by weight and the remainder a butter-like semisolid material.

To this material is added 25 kilograms of a 35% solution of hydrochloric acid, and the mixture is mixed and agitated well and allowed to settle for 4 days to obtain a highly viscous liquid containing bones and tendons and other solids in the amount of 15% by weight. The solids are filtered out to leave only liquid.

The liquid is left undisturbed for roughly 20 hours at room temperature so that it clearly separates into an upper layer of liquid and a lower layer of liquid.

The upper and lower layers are separated and each is placed in its own tank. The upper-layer liquid is filtered to remove fine solids and to 260 liters of this liquid are added 40 liters of methyl alcohol and 15 liters of aqueous acetic acid. The mixture is mixed and agitated well to obtain a total of 315 liters of a low-viscosity liquid.

In addition, taking the lower-layer liquid to be the second liquid, to 260 liters of this liquid are added 130 liters of water, 10 liters of a castor oil-based surfactant and 15 liters of an amine-based surfactant and mixed and agitated well to produce a total of 415 liters of emulsified liquid.

Next, the entire amount of said second liquid is supplied to a mixing tank where it is mixed and agitated at high speed as the first liquid is supplied gradually at a rate of 25 liters per minute, and mixing and agitation is performed for a total of 1 hour to obtain a liquid mixture.

Next, to this liquid mixture is supplied 580 liters of an aqueous solution of glucose and the mixture is mixed and agitated at high speed for 30 minutes to produce a concentrated liquid source of nutrition (fertilizer) for plants.

When the liquid source of nutrition (fertilizer) for plants produced as such (concentrate) was applied to crops as described below, the crops yielded the results described.

1. Application to a Tea Plantation

In a tea plantation, a nutrient solution obtained by diluting the concentrate 60-fold was sprayed in the amount of 600 liters per are in July, August and November of 1996, and in February and April of 1997.

The tea leaves harvested as new leaves in May 1997 exhibited taste and aroma markedly superior to tea leaves from plants not given nutrient solution, so the quality level was greatly improved.

2. Application to a Tomato Field

On May 19, 1997, a nutrient solution obtained by diluting the concentrate 100-fold was sprayed on tomato seedlings 10 days prior to transplanting in the amount of 10 liters per seedling. Then, the tomato seedlings were transplanted on May 29, 1997. On Jun. 20, 1997, the plants were given an additional spraying with the same nutrient solution in the same amount, and on Jun. 30, 1997, the plants were given an additional spraying with the same nutrient solution in the same amount.

By July 13, the plants had grown sufficiently for tomatoes to be harvested so the harvest was begun and the harvest continued until the end of September 1997. The branches that bore tomatoes numbered 14 levels per seedling, and the trunk reached a length of 4.2 meters. In addition, in comparison to tomatoes grown with chemical fertilizer, a harvest 1.5 times as large and an estimated quality value of 3 times as high were obtained.

3. Application to a Cucumber Field

In a cucumber field, the same nutrient solution used on the tomato field was sprayed under identical conditions, and as a result, by Jul. 10, 1997, the plants had grown sufficiently for cucumbers to be harvested, so the harvest was begun and continued continuously until around the end of August. In comparison to cucumbers grown with chemical fertilizer, there was almost no change in the harvest size but an estimated quality value of 2 times or greater was obtained.

4. Application to an Eggplant Field

In an eggplant field, the same nutrient solution used on the tomato field was sprayed under identical conditions, and as a result, by Jul. 18, 1997, the plants had grown sufficiently for the eggplant to be harvested, so the harvest was begun and continued continuously until around the middle of November. In comparison to eggplant grown with chemical fertilizer, a harvest 3 times as large and an estimated quality value of roughly 3 times as high were obtained.

5. Application to a Ginger Field

In furrows for cultivating ginger, on May 18, 1997, two weeks after transplanting, a nutrient solution obtained by diluting the concentrate 100-fold was sprayed through an irrigation hose in the amount of 10 liters per 1 meter of furrow. Then, the same nutrient solution was sprayed in the same amount under identical conditions on Jul. 20 and Aug. 20, 1997.

As a result, in a field planted in consecutive years, 80% of the harvest of a field not planted in consecutive years was obtained, so the problems of planting in consecutive years were overcome.

Note that the fields described in 1–5 above are on land near the home of the present inventor.

In summary, even though it is organic in nature, the liquid source of nutrition (fertilizer) for plants according to the present invention is concentrated so microbes cannot propagate, and thus it does not spoil so it has an excellent shelf life and does not degrade. In addition, since it has a good balance of the various nutrients of glucose, fatty acids and proteins, spraying it on the soil activates the countless soil microbes and symbiotic microbes living symbiotically with plant roots, so that the roots directly absorb the various nutrients which are the source of plant tissues. Thus, plant growth is markedly superior and plants can grow well even after spraying at a relatively low-temperature farm, and moreover, the plant stems, leaves and fruit grow strong and resistant to disease-causing insects. In addition, the crops have a dense texture and are delicious, so their product value is high.

Furthermore, the organic liquid source of nutrition according to the present invention sprayed on the soil activates the symbiotic microbes in the soil to decompose polluting substances artificially added and attain a return to the naturally balanced state.

Note that if the concentrate is diluted less than 5-fold, then it is too concentrated for plants, so it can be used as a weed killer.

What is claimed is:

1. An organic liquid source of nutrition for plants comprising a liquid mixture made from animal-derived raw materials decomposed naturally through the autolysis of cells, separated by addition of hydrochloric acid into a first liquid consisting primarily of fatty acids to which alcohol is added, and a second liquid consisting primarily of soluble protein to which surfactant is added, and a sugar-containing liquid mixed and agitated with these liquids.

2. The liquid source of nutrition according to claim 1, wherein said first liquid is a hydrophilic liquid whose viscosity is adjusted by addition of at least one of alcohol, aqueous acetic acid and urea.

3. The liquid source of nutrition according to claim 1, wherein said second liquid is a lipophilic liquid to which water and surfactant are added.

4. A manufacturing method for an organic liquid source of nutrition for plants comprising the steps of: allowing animal raw materials to undergo a primary natural decomposition through autolysis of cells after passage of a fixed period of time under constant temperature conditions; adding hydrochloric acid to the decomposed material thus obtained and allowing it to settle for a fixed period of time to undergo secondary decomposition and separate into a first liquid consisting primarily of fatty acids and a second liquid consisting primarily of soluble protein; adding alcohol to the separated first liquid to adjust its viscosity; adding water and surfactant to the aforementioned second liquid; agitating the second liquid while adding the first liquid; and agitating the liquid mixture thus obtained while adding a sugar-containing liquid.

5. The manufacturing method according to claim 4, wherein said animal raw materials are allowed to undergo natural decomposition by being left undisturbed in a sealed state for 5–10 days at 40–70° C.

6. The manufacturing method according to claim 4, wherein hydrochloric acid with a hydrochloric acid concentration of roughly 35% is added in the amount of no more than 6% by weight to said decomposed matter and subjected to secondary decomposition.

7. The manufacturing method according to claim 6 further comprising a step wherein endopeptidase is added to said secondary decomposed matter in the amount of 3–5% by weight.

8. The manufacturing method according to claim 4 further comprising a step wherein to said separated first liquid is added alcohol in the amount of no more than 20% by weight and aqueous acetic acid in the amount of no more than 10% by weight to obtain a hydrophilic solution.

9. The manufacturing method according to claim 4 wherein to said separated second liquid is added water in the amount of no more than 25% by weight and surfactant in the amount of 1–10% by weight to obtain a lipophilic solution.

10. The manufacturing method according to claim 4 to wherein said first liquid is added to said second liquid in roughly equal amounts.

11. The manufacturing method according to claim 4 wherein to the liquid mixture of said first liquid and second liquid is added 40–120% by weight of an aqueous solution of sugar.

12. The manufacturing method according to claim 11, wherein said sugar comprises glucose or blackstrap molasses.

* * * * *